(12) United States Patent
Andersson et al.

(10) Patent No.: US 9,098,189 B2
(45) Date of Patent: Aug. 4, 2015

(54) RESIZING SELECTION ZONES ON A TOUCH SENSITIVE DISPLAY RESPONSIVE TO LIKELIHOOD OF SELECTION

(75) Inventors: Ola Andersson, Sao Paolo (BR); Andreas Ljunggren, Vällingby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/238,622

(22) PCT Filed: Aug. 15, 2011

(86) PCT No.: PCT/IB2011/001878
§ 371 (c)(1),
(2), (4) Date: Feb. 12, 2014

(87) PCT Pub. No.: WO2013/024317
PCT Pub. Date: Feb. 21, 2013

(65) Prior Publication Data
US 2014/0192004 A1     Jul. 10, 2014

(51) Int. Cl.
G06F 3/041     (2006.01)
G06F 3/0488   (2013.01)
G06F 3/023     (2006.01)

(52) U.S. Cl.
CPC ............ *G06F 3/0488* (2013.01); *G06F 3/0237* (2013.01); *G06F 3/041* (2013.01); *G06F 3/04886* (2013.01)

(58) Field of Classification Search
None
See application file for complete search history.

(56) References Cited

U.S. PATENT DOCUMENTS

| 6,801,190 B1 | 10/2004 | Robinson et al. |
| 8,381,118 B2 * | 2/2013 | Minton ......................... 345/173 |
| 8,471,825 B2 * | 6/2013 | Miyazaki ....................... 345/173 |

(Continued)

FOREIGN PATENT DOCUMENTS

| EP | 2 149 837 A1 | 2/2010 |
| WO | WO 2009/034220 A1 | 3/2009 |
| WO | WO 2010/022435 A1 | 3/2010 |

OTHER PUBLICATIONS

International Search Report and Written Opinion of the International Searching Authority, PCT Application No. PCT/IB2011/001878, Jun. 11, 2012.

(Continued)

*Primary Examiner* — Muhammad N Edun
(74) *Attorney, Agent, or Firm* — Myers Bigel Sibley & Sajovec, P.A.

(57) ABSTRACT

An electronic device is disclosed for use with a touch-sensitive display. The electronic device includes a processor that displays indicia on the touch-sensitive display that can be touch selected by a user, and defines a size and location of a plurality of selection zones on the touch-sensitive display that are each associated with different ones of the indicia. The processor identifies a first one of the selection zones that has been selected by the user on the touch-sensitive display, and outputs a first one of the indicia that is associated with the first selection zone. The processor changes the size of a second one of the selection zones in response to it being associated with a second one of the indicia that is more likely to be selected next following selection of the first selection zone associated with the first indicia than at least another one of the selection zones. Related methods of operating an electronic device are disclosed.

21 Claims, 7 Drawing Sheets

(56) References Cited

U.S. PATENT DOCUMENTS

2003/0080945 A1    5/2003    Betts-LaCroix
2009/0007001 A1    1/2009    Morin et al.
2010/0115448 A1    5/2010    Lysytskyy et al.

OTHER PUBLICATIONS

International Preliminary Report on Patentability ("Corrected Version"), PCT Application No. PCT/IB2011/001878, Feb. 4, 2014.

* cited by examiner

– 1 –

RESIZING SELECTION ZONES ON A TOUCH SENSITIVE DISPLAY RESPONSIVE TO LIKELIHOOD OF SELECTION

CROSS REFERENCE TO RELATED APPLICATION

This application is a 35 U.S.C. §371 national stage application of PCT International Application No. PCT/IB2011/001878, filed on 15 Aug. 2011, the disclosure and content of which is incorporated by reference herein in its entirety. The above-referenced PCT International Application was published in the English language as International Publication No. WO 2013/024317 A1 on 21 Feb. 2013.

TECHNICAL FIELD

The present invention relates to electronic devices that include touch sensitive displays and, more particularly, to controlling the user input interface of touch sensitive displays.

BACKGROUND

Many electronic devices, such as wireless communication terminals (e.g., cellular telephones), personal digital assistants (PDAs), palmtop computers, and the like, include touch-sensitive displays that allow users to touch type on a displayed keyboard/keypad to enter information. Selection of individual keys on a display screen of a portable electronic device can be cumbersome and difficult, however. While the spatial resolution of a touch-sensitive display can be relatively high, users typically want to interact with a touch-sensitive display by touching it with a fingertip. Thus, the size of a user's fingertip limits the actual available resolution of the touch-sensitive display, which means that it can be difficult to manipulate small keyboard/keypad keys on the screen, particularly for users with large hands. Better touch resolution can be obtained by using a stylus instead of a fingertip. However, users may not want to have to use a separate instrument, such as a stylus, to interact with a touch-sensitive display.

System designers are faced with the difficult task of designing interfaces that can be used by a large number of people while also attempting to satisfy product requirements for displaying more touch-sensitive keys on diminutive displays and while achieving improved touch selection accuracy.

SUMMARY

Electronic devices are disclosed for use with a touch-sensitive display. An electronic device can include a processor that displays indicia on the touch-sensitive display that can be touch selected by a user, and defines a size and location of a plurality of selection zones on the touch-sensitive display that are each associated with different ones of the indicia. The processor identifies a first one of the selection zones that has been selected by the user on the touch-sensitive display, and outputs a first one of the indicia that is associated with the first selection zone. The processor changes the size of a second one of the selection zones in response to it being associated with a second one of the indicia that is more likely to be selected next following selection of the first selection zone associated with the first indicia than at least another one of the selection zones.

In some further embodiments, the selections zones for indicia having a higher likelihood of being selected next are increased, and the selection zones for adjacent indicia having a lower likelihood of being selected next are decreased to avoid overlap of the selection zones.

The accuracy of detecting the user's desired selections among the indicia that are displayed on the touch-sensitive display may thereby be increased because of the changes made to the sizes of the selection zones based on their likelihood of being selected next by the user.

Method of operating an electronic device having a touch-sensitive display are disclosed. A method can include displaying indicia on the touch-sensitive display that can be touch selected by a user. A size and location of a plurality of selection zones are defined on the touch-sensitive display and are each associated with different ones of the indicia. A first one of the selection zones that has been selected by the user on the touch-sensitive display is identified. A first one of the indicia that is associated with the first selection zone is outputted. The size of a second one of the selection zones is changed in response to it being associated with a second one of the indicia that is more likely to be selected next following selection of the first selection zone associated with the first indicia than at least another one of the selection zones.

Further electronic devices are disclosed that include a touch-sensitive display and a processor. The processor is configured to display indicia on the touch-sensitive display that can be touch selected by a user. The indicia are arranged within corresponding keys displayed on the touch-sensitive display to render at least a portion of a QWERTY keyboard. A size and location of a plurality of selection zones are defined on the touch-sensitive display, and which are each associated with different ones of the indicia. The size of the selection zones correspond to a default size of the corresponding keys when none of the selection zones has been selected for at least a defined time duration. A first one of the selection zones that has been selected by the user on the touch-sensitive display is identified. A first one of the indicia that is associated with the first selection zone is displayed on the touch-sensitive display. The size of a second one of the selection zones is increased from the default size of the corresponding key in response to the second selection zone being associated with a second one of the indicia that is more likely to be selected next following selection of the first selection zone associated with the first indicia than at least another one of the selection zones.

Other electronic devices, methods, and/or computer program products according to embodiments of the invention will be or become apparent to one with skill in the art upon review of the following drawings and detailed description. It is intended that all such additional electronic devices, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiments of the invention. In the drawings.

DETAILED DESCRIPTION

The following detailed description discloses various non-limiting example embodiments of the invention. The invention can be embodied in many different forms and is not to be construed as limited to the embodiments set forth herein.

Some electronic devices display virtual keys or other indicia that are arranged on a touch sensitive display. Each of the keys/indicia have an associated selection zone which a user can select using a finger or other object, such as a stylus, that is manipulated by the user. When the selection zones are arranged adjacent to one another, such as to form a keyboard on a relatively small display device, a user's finger or other object may overlap two or more selection zones and which may cause the electronic device to erroneously identify the wrong selection zone and associated key that the user intended to select. Some embodiments of the present invention arise from the present realization that an electronic device can be configured to control the size of individual ones of the selection zones in response to the individual likelihood that the associated selection zones will be selected next by a user following a previous selection of one or more of the selection zones. As used herein, a selection zone is a physical area on a display that can be touched by a user to trigger an associated response from the electronic device.

Figure 1:
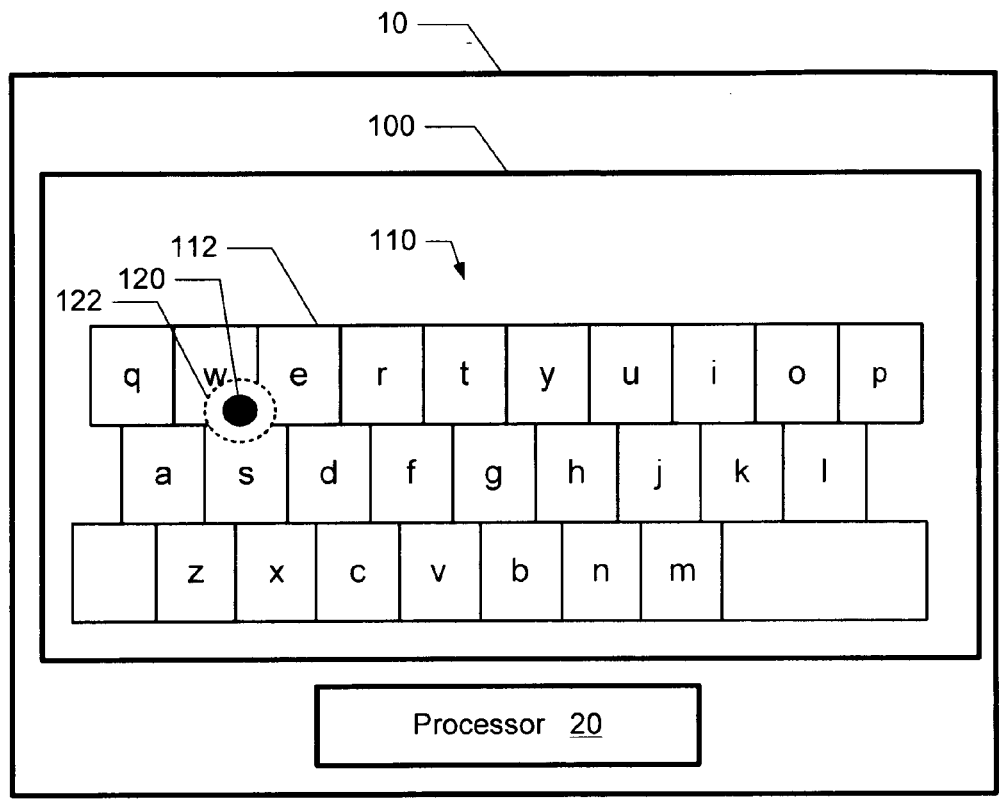
FIG. 1 illustrates an electronic device that includes a touch-sensitive display that displays a keyboard with keys having associated selection zones whose size is controlled according to some embodiments.

FIG. 1 illustrates an electronic device 10 that includes a touch-sensitive display 100 and an associated processor 20. The processor 20 displays on the display 100 an example keyboard 110 with keys 112 that each have an associated selection zone. The selection zone for each key 112 may, for example, have a default size that corresponds to the illustrated outline of the associated key 112, although the selection zone may be larger or smaller than the associated key 112. As shown in FIG. 1, when a user attempts to touch-select the "w" key 112 at location 120, the display 100 may sense the user's finger or other object as a region 122 that partially overlaps the default size of the selection zones of the "w", "s", and "e" keys 112. This partial overlap may lead to the processor 20 misidentifying the key 112 which the user intended to select, and undesirably outputting an indicia (e.g., character) that corresponds to the misidentified key 112.

The electronic device 10 (via the processor 20) can be configured to control the size of individual ones of the selection zones in response to the likelihood that the associated keys 112 will be selected next by a user following a previous selection of one or more of the keys 112.

Thus, for example, when a user is typing a word using the keyboard 110, the processor 20 can use a last entered letter or a sequentially entered string of letters to determine the relative likelihood that particular ones of the keys 112 will be selected next by the user. The processor 20 can then enlarge the size of the selection zones associated with the particular keys 112 having a higher likelihood of being selected next and can decrease the size of the selection zones associated with adjacent ones of the keys 112 having a lower likelihood of being selected next. The relative sizes of the selection zones for adjacent keys 112 may be adjusted to avoid overlap of the selection zones.

The accuracy for detecting the user's desired selections among the keys 112 on the keyboard 110 may thereby be increased because of the enlarged selection zones associated with the particular keys 112 having the higher likelihood of being selected can be more accurately selected by the user. Likewise, decreasing the selection zones associated with keys 112 which are determined to have a lower likelihood of being selected next by the user can avoid an erroneous identification of the user's selection of one of those keys if the user's finger or other controlled object undesirably overlaps the former default size, but not the present decreased size, of those selection zones.

These and other exemplary operations are further described below with reference to FIGS. 2-4 which illustrate portions of the keyboard of FIG. 1 with some keys having enlarged size selection zones and some adjacent other keys having decreased size selection zones according to some embodiments. Although a QWERTY keyboard layout is shown in FIG. 1, the invention is not limited thereto as it may be used to control the selection zones of a plurality of any type of indicia that can be displayed on a touch-sensitive display.

Figure 2:
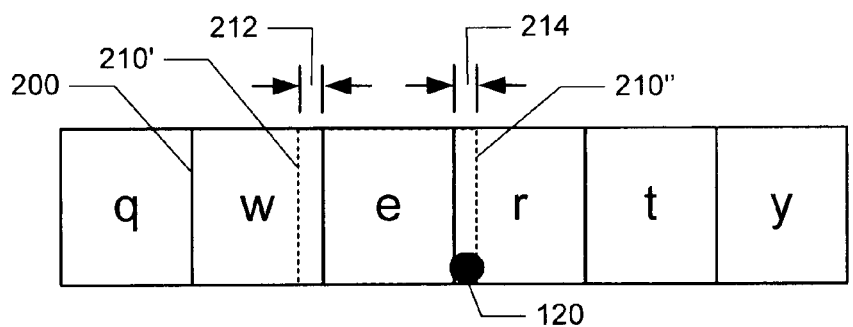
FIGS. 2-4 illustrate portions of the keyboard of FIG. 1 with some keys having enlarged size selection zones and some adjacent other keys having decreased size selection zones according to some embodiments.

Referring to FIG. 2, in response to determining that the "w" key 112 has been selected (FIG. 1), the processor 20 determines that the "e" key is more likely to be selected next by the user than the adjacent "w" and "r" keys.

The processor 20 may determine which letters are more likely to be selected next after one or more previous entered letters in response to: 1) information that is stored in or accessible by the processor 20 that identifies a known commonality of the letters in English or another language alphabet (e.g., sequence "we" is known to be more common than sequences "ww" and "wr"); and/or 2) identifying matches between combinations of entered letter or string of letters and potential next letter selections on the keyboard 110 to entries within a dictionary database of words (e.g., sequence "we" matches more words in the dictionary than sequences "ww" and "wr"). The processor 20 may additionally or alternatively track sequences of letters that the user has entered into the store information that characterizes those tracked sequences, and compare the presently entered letter or sequence of letters to information identifying the tracked sequences to determine which letters on the keyboard 110 are more likely to be selected next by the user relative to other letters on the keyboard 110 (e.g., sequence "we" is determined to have been previously entered or entered more frequently by the user than sequences "ww" and "wr").

Still referring to FIG. 2, the processor 20 responds to the determination by increasing the selection zone for the "e" key to include the expanded regions indicated by the dashed lines 210', thereby provide increased widths 212, 214 for the selection zone beyond sides of the "e" key. The processor 20 may additionally or alternatively expand the selection zone for the "e" key upward and/or downward. The processor 20 may correspondingly decrease the size of the selection zones for the adjacent "w" and "r" keys to, for example, prevent their overlap with the expanded region of the selection zone for the "e" key. In this manner, when the user's next touch selection occurs at the location 120 shown in FIG. 2, the processor 20 will detect the location 120 within the expanded selection zone for the "e" key and, therefore, determine that the user selected the "e" key and output data indicating that the "e" letter has been input by the user.

Accordingly, although the location 120 is outside the border of the "e" key that is displayed on the display 100 (and may be outside a default size of the selection zone for the "e" key), the processor 20 will still properly determined that the user selected the "e" key instead of erroneously detecting selection of the adjacent "r" key. In this manner, the processor 20 controls the size of the selection zones based on the likelihood of the associated keys being selected next by the user, which can increase the accuracy with which the user can enter text or other symbols through the keyboard 110 on the touch-sensitive display 100.

The processor 20 may return the size of the selection zones back to respectively defined default sizes (e.g., initial sizes of the selection zones when the electronic device 10 is initialized after power-up) when none of the selection zones have been selected for at least a defined time duration.

Figure 3:
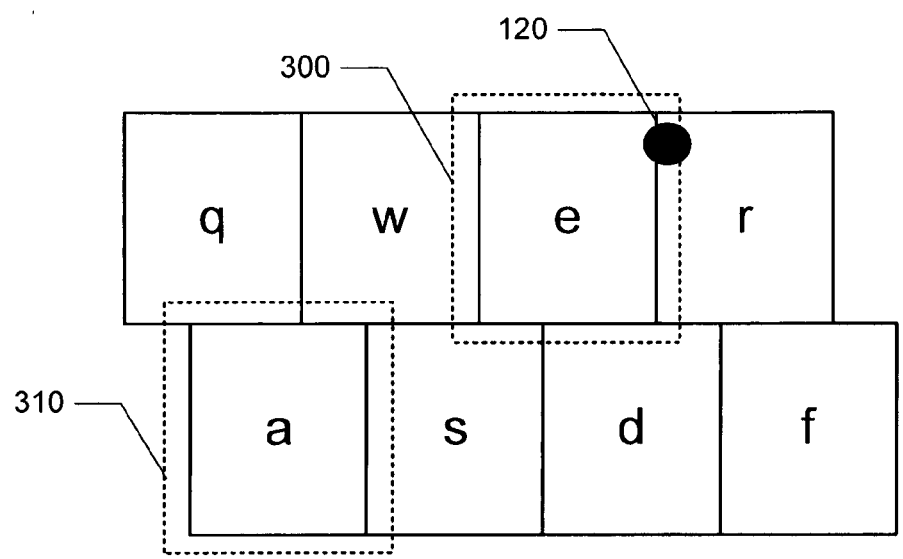

FIG. 3 illustrates a further portion of the keyboard 110 for which the processor 20 has enlarged in two dimensions (top, bottom, and sides) the selection zone 300 associated with the "e" key and the selection zone 310 associated with the "a" key in response to which lettered key was previously selected by the user, such in response to selection of the "w" key selected in FIG. 1 or selection of the "e" key selected in FIG. 2.

Figure 4:
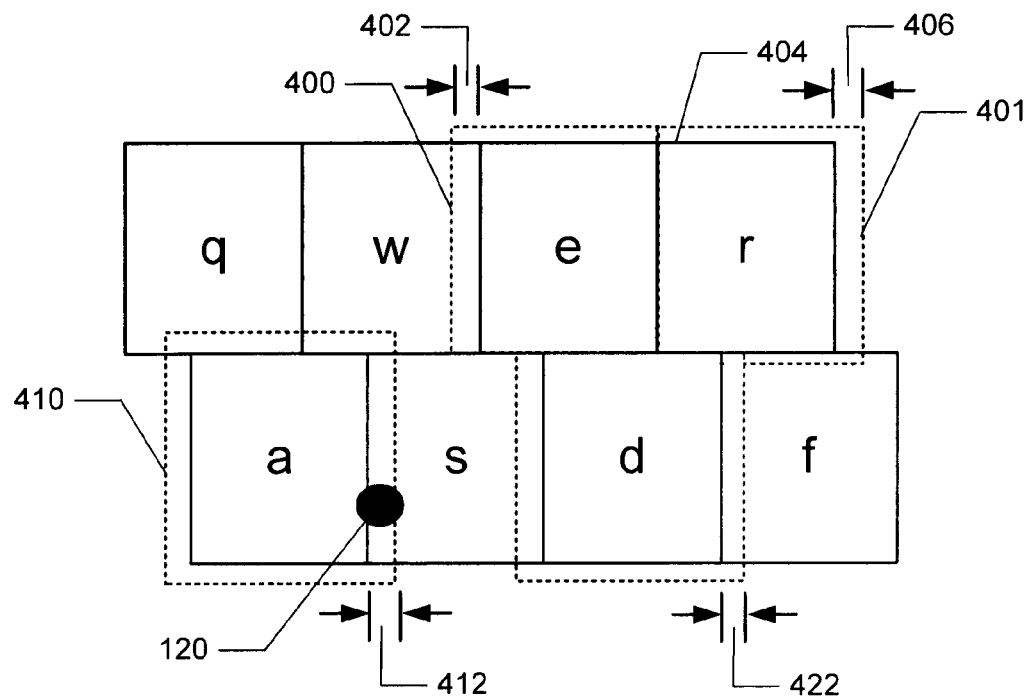

FIG. 4 illustrates a further portion of the keyboard 110 for which the processor 20 has enlarged the selection zones associated with various keys that are more likely than other ones of the keys displayed in FIG. 4 to be selected next by the user following selection of the "e" key by the user. The size of the each of the selection zones can be separately controlled based on the relative likelihood that the associated key will be selected next.

For example, as shown in FIG. 4, the selection zone for the "e" key has been expanded to the left long the dashed line 400 to provide an increased width 402, and the selection zone for the "r" key has been expanded to the right along the dashed line 401 to provide an increased width 406. The processor 20 has determined that the "e" and "r" keys have about the same likelihood of being selected following the previous selection of the "e" key and, therefore, has not moved the border 404 between the selection zones for the "e" and "r" keys to expand one selection zone to the detriment of decreasing the other selection zone to prevent overlap.

The processor 20 has determined that the "r" and "d" keys are more likely to be selected next, following the "e" key, relative to the adjacent "f" key and has, therefore, responded by enlarging the selection zones for the "r" and "d" keys to overlap a portion of the illustrated "f" key while decreasing the selection zone associated with the adjacent "f" key to prevent overlap of the selection zones. The selection zones for the "r" and "d" keys therefore have increased widths 406 and 422, respectively.

The processor 20 has further determined that the "a" key is more likely to be selected next, following the "e" key, relative to the adjacent "q", "w", and "s" keys and has, therefore, responded by enlarging the selection zone 410 associated with the "a" key while decreasing the selection zones associated with the adjacent "q", "w", and "s" keys to prevent overlap of the selection zones. Accordingly, although the touch location 120 shown in FIG. 4 is outside the border of the "a" key that is displayed on the display 100, the processor 20 will still properly determined that the user selected the "a" key instead of erroneously detecting selection of the adjacent "s" key.

In this manner, the processor 20 can make a decision to selectively expand or contract the location of each side and/or portion of a side of a selection zone based on the likelihood that the associated key will be selected next relative to the adjacent keys on different respective sides of that key. Therefore, in some embodiments, the shape of a selection zone is not necessarily changed in a uniform way along all four sides, but instead may be controlled based on the relative likelihood of selection of various adjacent keys. A higher likelihood of selection can cause the processor 20 to expand the selection zone for a particular key to overlap the displayed border of an adjacent key having a lower likelihood of selection, with the selection zone for that adjacent key being reduced to avoid overlap by the expanded selection zone.

FIGS. 5-11 are flowcharts that illustrate more generalized exemplary operations and methods 500 that can be carried out by the processor 20 of the electronic device 10 to display indicia on a touch-sensitive display 100, to define a size and location of selection zones on the touch-sensitive display 100 with each associated with different ones of the indicia, and to control the size of the selection zones in accordance with some embodiments.

Figure 5:
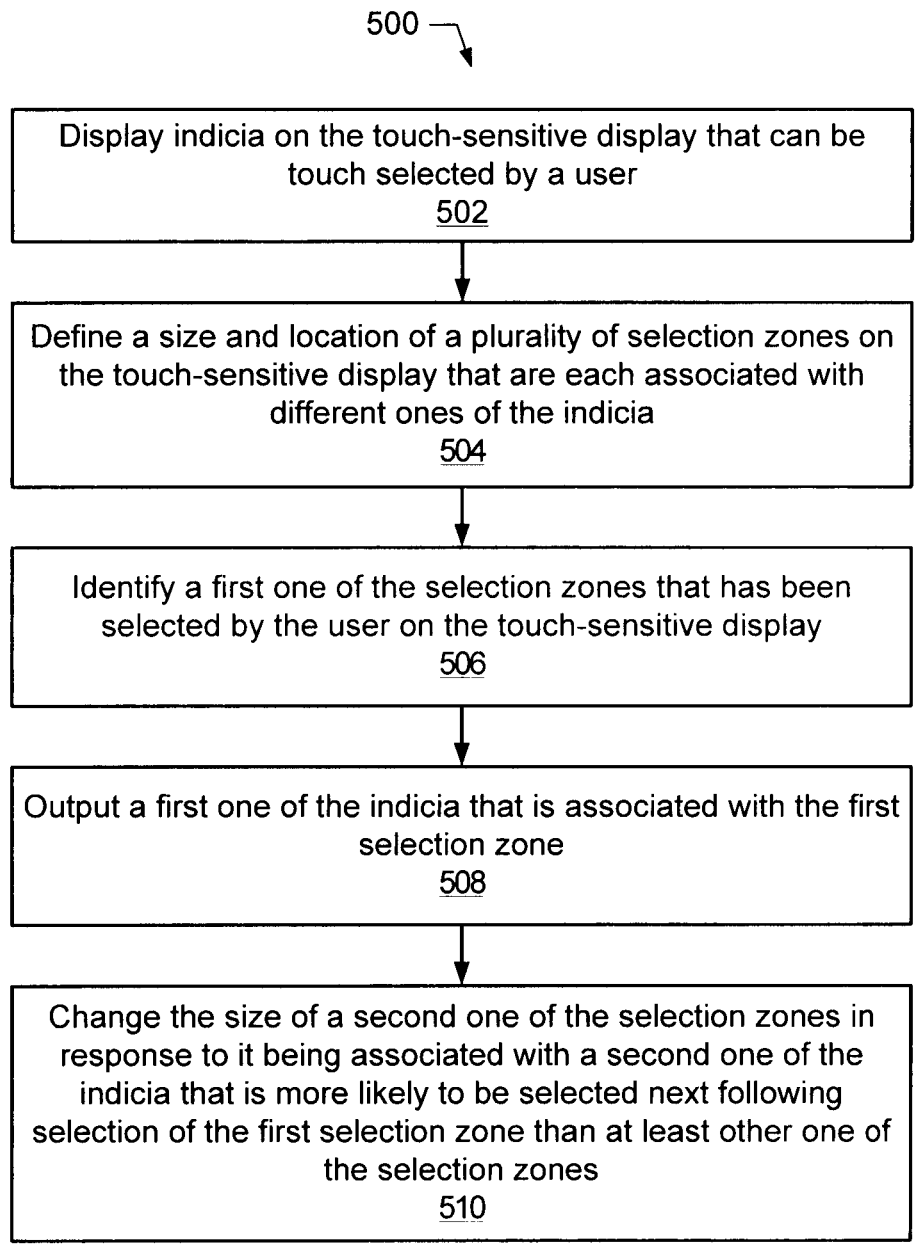
FIGS. 5-11 are flowcharts that illustrate exemplary operations and methods that are carried out by an electronic device to display indicia on a touch-sensitive display, define a size and location of selection zones on the touch-sensitive display each associated with different ones of the indicia, and control size of the selection zones in accordance with some embodiments.

Referring to FIG. 5, the processor 20 displays (block 502) indicia on the display 100 that can be touch selected by a user. The size and location of a plurality of selection zones on the display 100 are defined (block 504) so that each is associated with a different one of the indicia. A first one of the selection zones that has been selected by the user on the display 100 is identified (block 506). A first one of the indicia that is associated with the first selection zone is output (block 508). The processor 20 changes (block 510) the size of a second one of the selection zones in response to it being associated with a second one of the indicia that is more likely to be selected next following selection of the first selection zone associated with the first indicia than at least another one of the selection zones.

Figure 6:
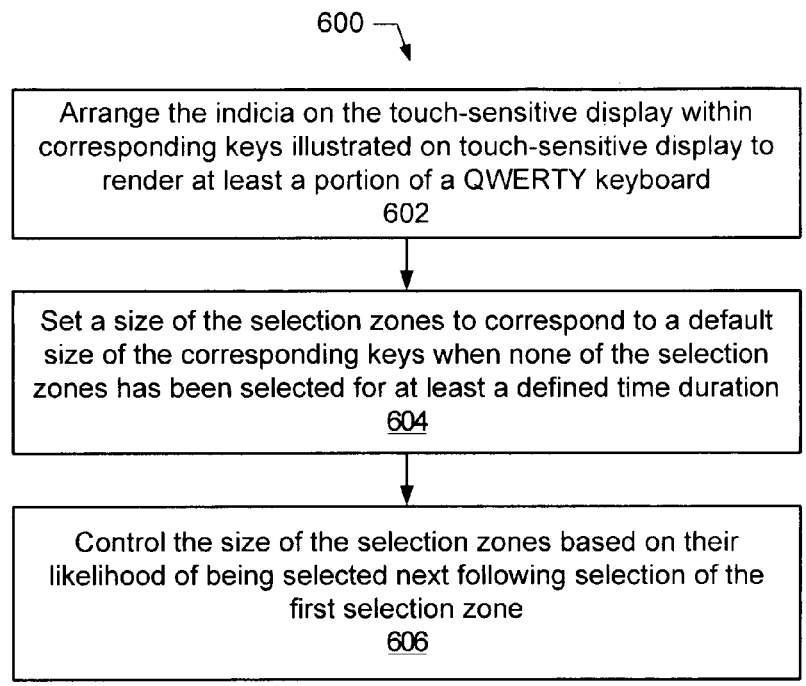
Figure 7:
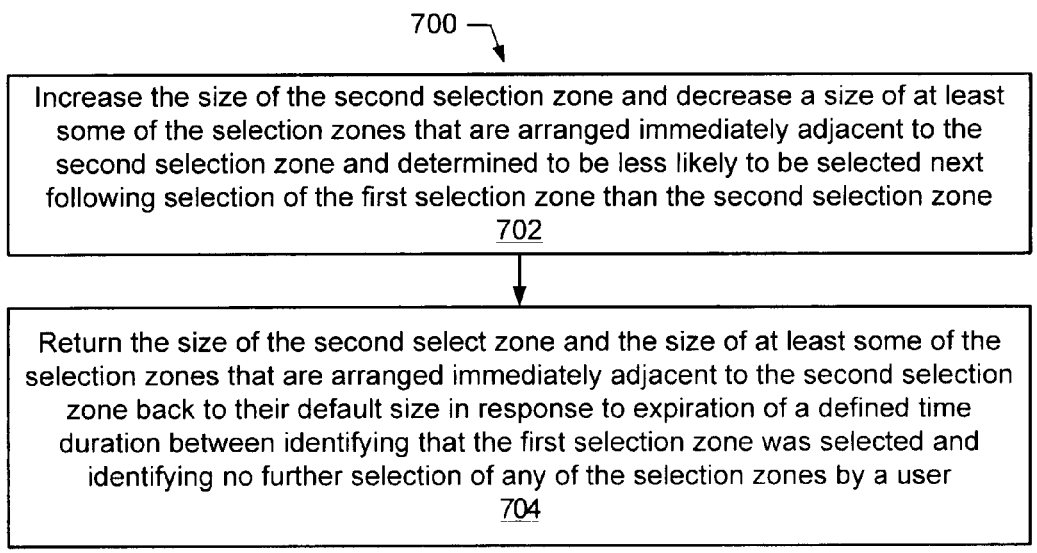

Referring to FIG. 6, in some further embodiments the processor 20 controls the selection zones for a QWERTY keyboard, such as the keyboard 110 shown in FIG. 1. The processor 20 can therefore be configured to arrange (block 602) the indicia on the display 100 within corresponding keys illustrated on display 100 to render at least a portion of a QWERTY keyboard 110. The processor 20 sets (block 604) a size of the selection zones to correspond to a default size of the corresponding keys when none of the selection zones has been selected for at least a defined time duration. The size of the selection zones is controlled (block 606) based on their likelihood of being selected next following selection of the first selection zone Referring to FIG. 7, in some further embodiments the processor 20 controls the size of adjacently located selection zones based on the relative likelihood of being selected next following the last inputted letter or other indicia. Accordingly, the processor 20 increases (block 702) the size of the second selection zone and decreases a size of at least some of the selection zones that are arranged immediately adjacent to the second selection zone and determined to be less likely to be selected next following selection of the first selection zone than the second selection zone.

The processor 20 may return (block 704) the size of the second select zone and the size of at least some of the selection zones that are arranged immediately adjacent to the second selection zone back to their default size in response to expiration of a defined time duration between identifying that the first selection zone was selected and identifying no further selection of any of the selection zones by a user. For example, after the user stops touching the display 100 for a defined time duration, the processor 20 may respond by changing the size of any enlarged/decreased size selection zones back to their respective default sizes. In some embodiments, some or all of the resizable selection zones may have the same default size.

The processor 20 may set the selection zones to their default sizes in response to power-up of the electronic device 10.

Figure 8:
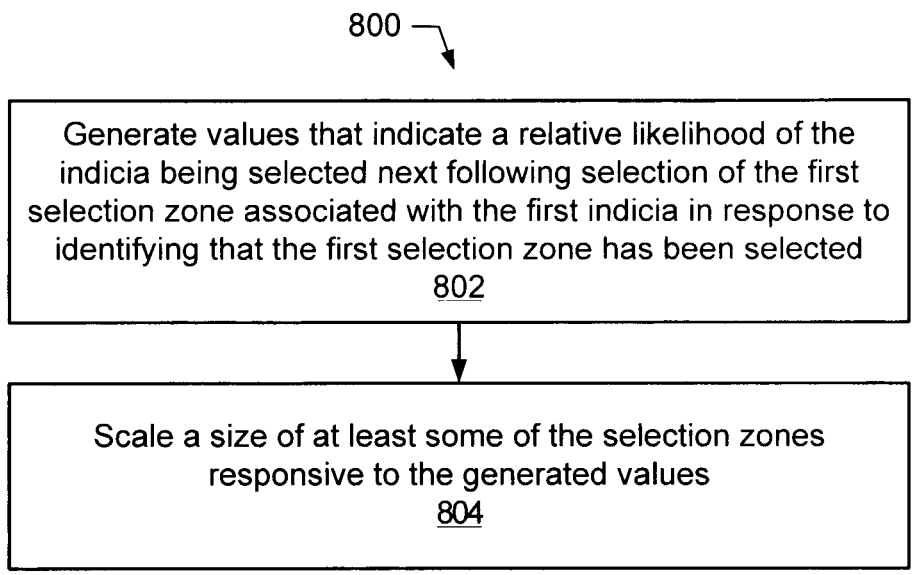

Referring to FIG. 8, in some further embodiments the processor 20 may scale the relative sizes of adjacently located selection zones based on values that indicate a relative likelihood of the associated keys or other indicia being selected next. Accordingly, the processor 20 can generate (block 802) values that indicate a relative likelihood of the indicia being selected next following selection of the first selection zone associated with the first indicia in response to identifying that the first selection zone has been selected. Processor 20 may then scale (block 804) a size of at least some of the selection zones responsive to the generated values.

Figure 9:
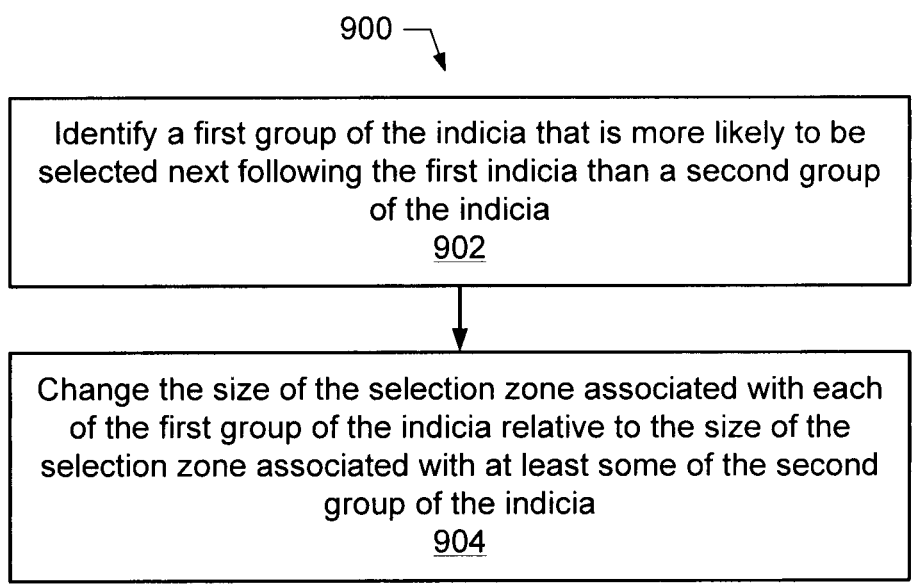

Referring to FIG. 9, the keys or other indicia can be grouped based on their likelihood of selection, and the size of the selection zones can be controlled based on which group they are associated with. Accordingly, the processor 20 can operate to identify (block 902) a first group of the indicia that is more likely to be selected next following the first indicia than a second group of the indicia, and to change the size (block 904) of the selection zone associated with each of the first group of the indicia relative to the size of the selection zone associated with at least some of the second group of the indicia.

Figure 10:
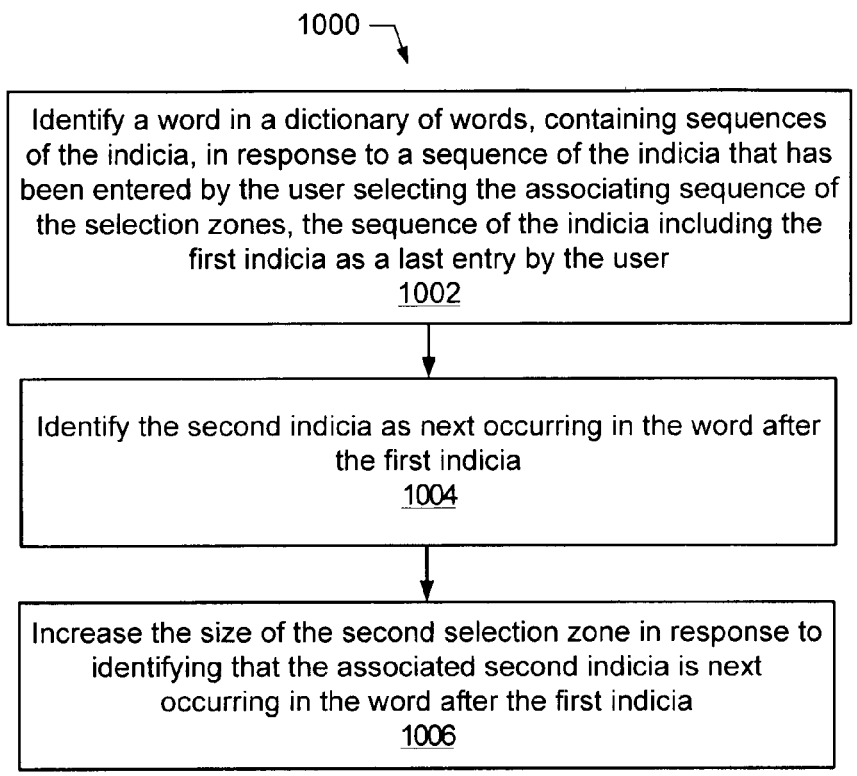

Referring to FIG. 10, the likelihood of selection of a key or other indicia can be determined based on a sequence of keys/indicia that have been selected as a part of word being entered by a user. Accordingly, the processor 20 can operate to identify (block 1002) a word in a dictionary of words, containing sequences of the indicia, in response to a sequence of the indicia that has been entered by the user selecting the associating sequence of the selection zones. The dictionary of words may be within a memory of the processor 20 or otherwise accessible by the processor 20. The sequence of the indicia includes the first indicia as a last entry by the user. The processor 20 identifies (block 1004) the second indicia as next occurring in the word after the first indicia, and increases (block 1006) the size of the second selection zone in response to identifying that the associated second indicia is next occurring in the word after the first indicia.

Figure 11:
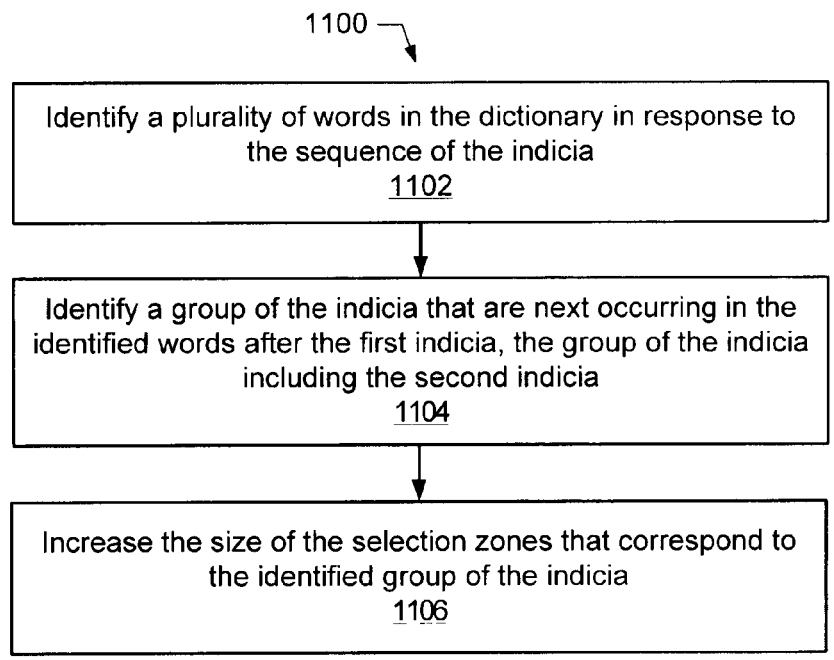

Referring to FIG. 11, a further embodiment based on the operations of FIG. 10 can include having the processor 20 identify a plurality of words in the dictionary that contain the string of entered indicia and further identify the next occurring character/indicia in each of those words. The corresponding selection zone for each of the identified next occurring indicia can be increase in size to facilitate the user's selection thereof. Accordingly, the processor 20 can operate to identify (block 1102) a plurality of words in the dictionary in response to the sequence of the indicia. The processor 20 can further identify (block 1104) a group of the indicia that are next occurring in the identified words after the first indicia, the group of the indicia including the second indicia explained above with regard to FIG. 5. The processor 20 can then increase (block 1106) the size of the selection zones that correspond to the identified group of the indicia.

Figure 12:
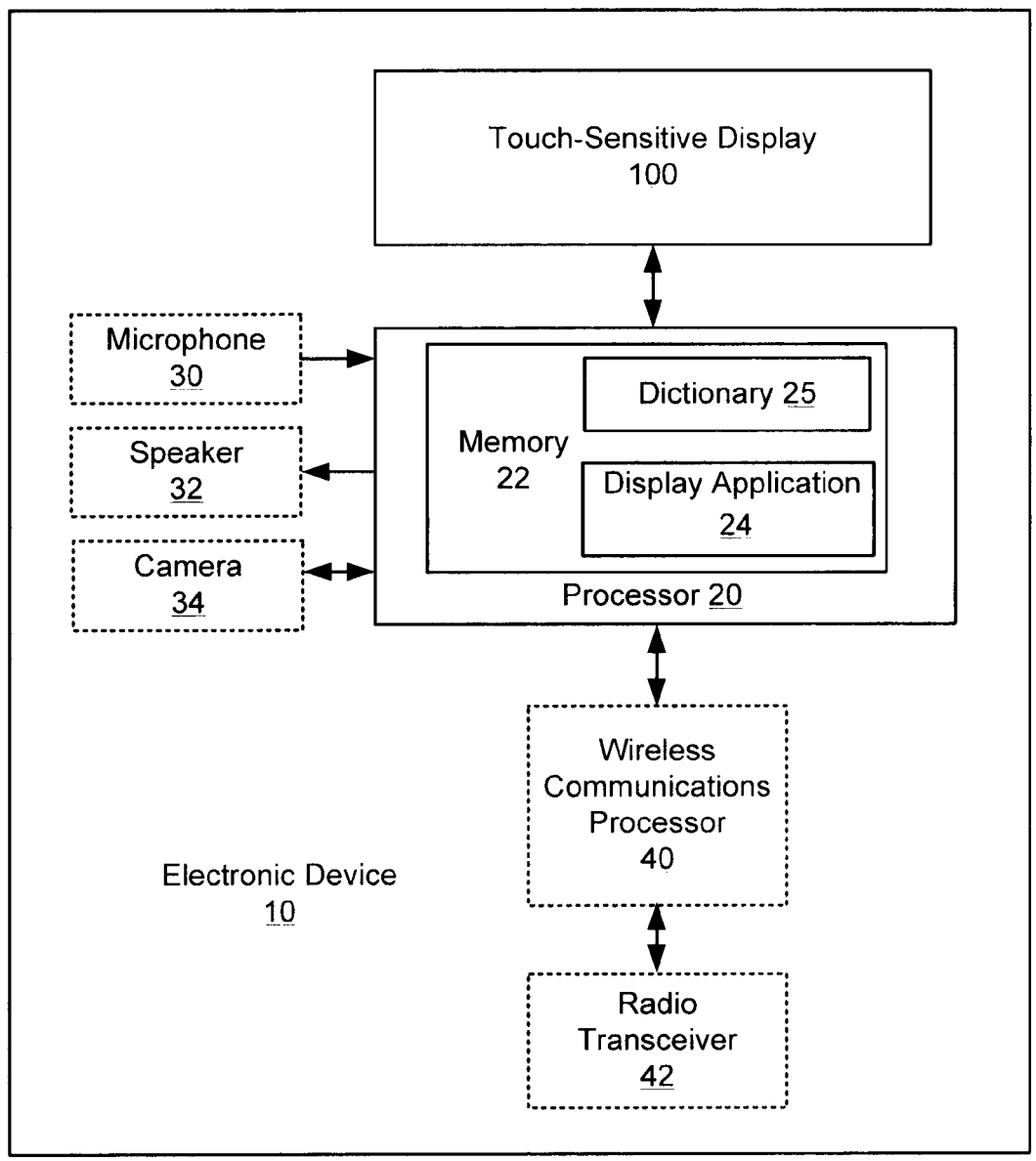
FIG. 12 is a block diagram that illustrates further components that may be included in the electronic device of FIG. 1 that controls the size of selection zones according to some embodiments.

FIG. 12 is a block diagram that illustrates further components that may be included in the electronic device 10 of FIG. 1 according to some embodiments. Referring to FIG. 12, the electronic device 10 can include the touch-sensitive display 100 and the processor 20 that are configured according to some embodiments disclosed herein.

The touch-sensitive display 100 may be any suitable assembly that is configured to display graphical images and to detect user touch selections thereon and to convert the detected touches into positional information that is conveyed through a touch signal for processed by the processor 20. The display 100 may, for example, include a liquid crystal display (LCD) with or without auxiliary lighting (e.g., a lighting panel). The display 100 may include a resistive touchscreen panel, a capacitive touchscreen panel, a side-optical touchscreen panel, and/or another touch sensitive panel technology. A resistive touchscreen panel can include two spaced-apart thin metallic electrically conductive and resistive layers that connect to conduct electrical current at one or more locations where a user touches the display 100. This electrical current can be used by the processor 20 to detect the coordinate locations of the one or more locations where the user is touching the display 100.

A capacitive touchscreen panel can be coated with a material, such as indium tin oxide, that conducts a continuous electrical current across a sensor to form a controlled field of stored electrons in both X and Y axes. When the capacitance field of the capacitive touchscreen panel is altered by another capacitance field, e.g., a user's finger, the processor 20 can measure the distortion and identify X and Y axes location(s) of the disturbance.

A side-optical touchscreen panel can include a grid of optical detectors on top of the surface of the display 100. Light is sent from one side to the other and received by an array of detectors. The beams of light are broken when a finger or stylus is in close proximity such that the location can be translated into X and Y coordinates by the processor 20.

The processor 20 may include one or more data processing circuits, such as a general purpose and/or special purpose processor (e.g., microprocessor and/or digital signal processor), and may include a memory 22 or be configured to access an external memory. When configured as shown in FIG. 12, the processor 20 is configured to execute computer program instructions from a display application 24 in the memory 22, described below as a computer readable medium, to perform at least some of the operations and methods of FIGS. 1-11 described herein as being performed by the electronic device 10. The memory 22 may further include a dictionary 25 that is accessed by the processor 20 to lookup words that are being entered by a user, such as described above with regard to FIGS. 10 and 11.

The electronic device 10 may further include a wireless communications processor 40 and a radio transceiver 42 that are configured to communicate using one or more cellular radio access technologies that may include, but are not limited to, Global Standard for Mobile (GSM), General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), and/or 3GPP LTE (3rd Generation Partnership Project Long Term Evolution). The wireless communications processor 40 and a radio transceiver 42 may alternatively or additionally be configured to communicate through a Wireless Local Area Network (i.e., IEEE 802.11) interface, a Bluetooth interface, and/or another radio frequency (RF) interface.

The electronic device 10 may further include other components such as, without limitation, a microphone 30, a speaker 32, and/or a camera 34.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. An electronic device for use with a touch-sensitive display, the electronic device comprising:
   a processor that is configured to:
   display indicia on the touch-sensitive display that can be touch selected by a user;
   define a size and location of a plurality of selection zones on the touch-sensitive display that are each associated with different ones of the indicia;
   identify a first one of the selection zones that has been selected by the user on the touch-sensitive display;

output a first one of the indicia that is associated with the first selection zone; and change the size of a second one of the selection zones in response to it being associated with a second one of the indicia that is more likely to be selected next following selection of the first selection zone associated with the first indicia than at least another one of the selection zones, wherein the size of the second selection zone is changed by, for each side of the second selection zone, selectively expanding or contracting the location of at least a portion of the side toward or away, respectively, another selection zone immediately adjacent to the side based on comparison of the likelihood that the second indicia will be selected next compared to the likelihood that an indicia associated with the another selection zone immediately adjacent to the side will be selected next.

2. The electronic device of claim 1, wherein:

a first side of the second selection zone is expanded toward a third one of the selection zones immediately adjacent to the first side based on the second indicia being more likely to be selected next than an indicia associated with the third selection zone; and a second side of the second selection zone, which is opposite to the first side, is not moved relative to a fourth one of the selection zones immediately adjacent to the second side based on the second indicia having the same likelihood of being selected next compared to an indicia associated with the fourth selection zone.

3. The electronic device of claim 1, wherein each of the selection zones have a height and width defined by interconnected borders, and locations of each of the borders of a selection zone are separately controlled to expand or contract the height or width in a direction based on comparison of the likelihood that the associated key will be selected next, following selection of the first selection zone associated with the first indicia, relative to the likelihood that an immediately adjacent key in the direction will be selected next.

4. The electronic device of claim 1, wherein the processor is further configured to:

arrange the indicia on the touch-sensitive display within corresponding keys illustrated on touch-sensitive display to render at least a portion of a QWERTY keyboard;

set a size of the selection zones to correspond to a default size of the corresponding keys when none of the selection zones has been selected for at least a defined time duration; and control the size of the selection zones based on their likelihood of being selected next following selection of the first selection zone.

5. The electronic device of claim 1, wherein the processor is further configured to:

increase the size of the second selection zone and to decrease a size of at least some of the selection zones that are arranged immediately adjacent to the second selection zone and determined to be less likely to be selected next following selection of the first selection zone than the second selection zone.

6. The electronic device of claim 5, wherein the at least some of the selection zones that are arranged immediately adjacent to the second selection zone are decreased in size to not overlap the second selection zone having the increased size.

7. The electronic device of claim 5, wherein the processor is further configured to:

return the size of the second select zone and the size of at least some of the selection zones that are arranged immediately adjacent to the second selection zone back to their default size in response to expiration of a defined time duration between identifying that the first selection zone was selected and identifying no further selection of any of the selection zones by a user.

8. The electronic device of claim 5, wherein the processor is further configured to:

return the size of the second select zone to a default size in response to identifying selection of a third one of the selection zones associated with a third one of the indicia and determining that the second selection zone is now less likely to be next selected than another one of the selection zones that is not arranged immediately adjacent to the second selection zone.

9. The electronic device of claim 1, wherein the processor is further configured to:

generate values that indicate a relative likelihood of the indicia being selected next following selection of the first selection zone associated with the first indicia in response to identifying that the first selection zone has been selected; and scale a size of at least some of the selection zones responsive to the generated values.

10. The electronic device of claim 1, wherein the processor is further configured to:

change the size of at least one of the selection zones in response to a sequence of the selection zones selected by the user.

11. The electronic device of claim 10, further comprising:

a memory comprising a dictionary of words containing sequences of the indicia, wherein the processor is further configured to:

identify a word in the dictionary in response to a sequence of the indicia that has been entered by the user selecting the associating sequence of the selection zones, the sequence of the indicia including the first indicia as a last entry by the user;

identify the second indicia as next occurring in the word after the first indicia; and increase the size of the second selection zone in response to identifying that the associated second indicia is next occurring in the word after the first indicia.

12. The electronic device of claim 11, wherein the processor is further configured to:

identify a plurality of words in the dictionary in response to the sequence of the indicia;

identify a group of the indicia that are next occurring in the identified words after the first indicia, the group of the indicia including the second indicia; and increase the size of the selection zones that correspond to the identified group of the indicia.

13. A method of operating an electronic device having a touch-sensitive display, the method comprising:

displaying indicia on the touch-sensitive display that can be touch selected by a user;

defining a size and location of a plurality of selection zones on the touch-sensitive display that are each associated with different ones of the indicia;

identifying a first one of the selection zones that has been selected by the user on the touch-sensitive display;

outputting a first one of the indicia that is associated with the first selection zone; and changing the size of a second one of the selection zones in response to it being associated with a second one of the indicia that is more likely to be selected next following selection of the first selection zone associated with the first indicia than at least another one of the selection zones wherein the size of the second selection zone is changed by, for each side of the second selection zone, selectively expanding or contracting the location of at least a portion of the side toward or away, respectively, another selection zone immediately adjacent to the side based on comparison of the likelihood that the second indicia will be selected next compared to the likelihood that an indicia associated with the another selection zone immediately adjacent to the side will be selected next.

14. The method of claim 13, further comprising:

expanding a first side of the second selection zone toward a third one of the selection zones immediately adjacent to the first side based on the second indicia being more likely to be selected next than an indicia associated with the third selection zone; and not moving a second side of the second selection zone, which is opposite to the first side, relative to a fourth one of the selection zones immediately adjacent to the second side based on the second indicia having the same likelihood of being selected next compared to an indicia associated with the fourth selection zone.

15. The method of claim 13, wherein each of the selection zones have a height and width defined by interconnected borders, and further comprising separately controlling locations of each of the borders of a selection zone to expand or contract the height or width in a direction based on comparison of the likelihood that the associated key will be selected next, following selection of the first selection zone associated with the first indicia, relative to the likelihood that an immediately adjacent key in the direction will be selected next.

16. The method of claim 13, further comprising:

arranging the indicia on the touch-sensitive display within corresponding keys illustrated on touch-sensitive display to render at least a portion of a QWERTY keyboard;

setting a size of the selection zones to correspond to a default size of the corresponding keys when none of the selection zones has been selected for at least a defined time duration; and controlling the size of the selection zones based on their likelihood of being selected next following selection of the first selection zone.

17. The method of claim 13, further comprising:

increasing the size of the second selection zone and decreasing a size of at least some of the selection zones that are arranged immediately adjacent to the second selection zone and determined to be less likely to be selected next following selection of the first selection zone than the second selection zone, wherein the at least some of the selection zones that are arranged immediately adjacent to the second selection zone are decreased in size to not overlap the second selection zone having the increased size.

18. The method of claim 13, further comprising:

increasing the size of the second selection zone and decreasing a size of at least some of the selection zones that are arranged immediately adjacent to the second selection zone and determined to be less likely to be selected next following selection of the first selection zone than the second selection zone; and returning the size of the second select zone and the size of at least some of the selection zones that are arranged immediately adjacent to the second selection zone back to their default size in response to expiration of a defined time duration between identifying that the first selection zone was selected and identifying no further selection of any of the selection zones by a user.

19. The method of claim 13, further comprising:

generating values that indicate a relative likelihood of the indicia being selected next following selection of the first selection zone associated with the first indicia in response to identifying that the first selection zone has been selected; and scaling a size of at least some of the selection zones responsive to the generated values.

20. The method of claim 13, further comprising:

identifying a word in a dictionary of words, containing sequences of the indicia, in response to a sequence of the indicia that has been entered by the user selecting the associating sequence of the selection zones, the sequence of the indicia including the first indicia as a last entry by the user;

identifying the second indicia as next occurring in the word after the first indicia; and increasing the size of the second selection zone in response to identifying that the associated second indicia is next occurring in the word after the first indicia.

21. The method of claim 20, further comprising:

identifying a plurality of words in the dictionary in response to the sequence of the indicia;

identifying a group of the indicia that are next occurring in the identified words after the first indicia, the group of the indicia including the second indicia; and increasing the size of the selection zones that correspond to the identified group of the indicia.

* * * * *